United States Patent [19]

Tanaka

[11] Patent Number: 4,536,359

[45] Date of Patent: Aug. 20, 1985

[54] METHOD OF MANUFACTURING CARBON ELECTRODE

[75] Inventor: Torata Tanaka, Itami, Japan

[73] Assignee: Nikku Industry Co., Ltd., Hyogo, Japan

[21] Appl. No.: 540,976

[22] Filed: Oct. 11, 1983

[51] Int. Cl.³ .............................................. B29B 1/04
[52] U.S. Cl. .................................. 264/102; 264/101; 264/105; 264/308
[58] Field of Search ............... 264/105, 101, 308, 102

[56] References Cited

U.S. PATENT DOCUMENTS

| 1,654,046 | 12/1927 | Kahl | 264/105 |
| 2,269,880 | 1/1942 | Morin et al. | 264/308 |
| 2,960,726 | 11/1960 | Sheer et al. | 264/105 |

FOREIGN PATENT DOCUMENTS

| 506728 | 6/1939 | United Kingdom | 264/308 |
| 624796 | 9/1978 | U.S.S.R. | 264/308 |

Primary Examiner—James Derrington
Attorney, Agent, or Firm—Armstrong, Nikaido, Marmelstein & Kubovcik

[57] ABSTRACT

The present invention provides a method of manufacturing improved carbon electrodes.

According to this method, the raw material for the carbon electrodes is pulverized and then kneaded with a binder.

The kneaded mixture thus obtained is compressed under reduced pressure and thereafter extrusion-molded. This molded product is baked to obtain the desired carbon electrodes.

1 Claim, 3 Drawing Figures

METHOD OF MANUFACTURING CARBON ELECTRODE

BACKGROUND OF THE INVENTION

This invention relates to a method of manufacturing carbon electrodes, and more particularly to a method of manufacturing carbon electrodes which enables the elimination of unevenness of quality between each lot of products, i.e. carbon electrodes, to improve the quality thereof and provide carbon electrodes which have a reduced basic consumption unit and are free from abnormal breakages.

Carbon material is generally manufactured in accordance with the steps shown in FIG. 1. A raw material, for example petroleum coke or regular coke 1, is broken up into comparatively large particles in a coarse grinder 2, the resultant coke is sorted in a sieving unit 3 and is then broken up into fine particles if necessary in a pulverizer 4. The distribution of sizes of the pulverized coke is adjusted, and the different sizes are then stored in storage vessels 5.

In the meantime, a binder consisting, for example, of coal tar pitch is placed in a storage vessel 6. The grain size-adjusted coke and binder are kneaded in a kneader 7 while the materials are heated. The kneaded product is then formed by extrusion molding or cast molding.

To extrusion-mold the kneaded mixture, it is cooled in a cooler 8 and then extruded through a nozzle of a predetermined shape by an extruder 9.

To cast-mold the kneaded mixture, it is cooled to room temperature and then re-pulverized in a re-pulverizer 10 to re-adjust the grain size distribution thereof. The re-pulverized mixture is compression-molded in a molding machine 11.

The molded product 12 thus obtained is baked in a baking furnace 13 and then impregnated with pitch in an impregnator 14. The resultant mass is re-baked to obtain a baked product 15, which is heat-treated if necessary with graphitized lead 16 to obtain a graphitized product 17.

To manufacture carbon electrodes by this method, the kneaded starting material is extruded to a predetermined length to obtain molded products for the carbon electrodes.

However, in such a conventional method of manufacturing carbon electrodes, it is difficult to remove bubbles and water, which have been entrained in the kneaded product, while the kneaded product is being compressed in a container 20. Since these bubbles and water act as cushions during the compressions, unevennesses in the degree of compression occur in the molded product. Accordingly, the molded products for carbon electrodes extruded from a nozzle 25 inevitably have parts of different densities.

Therefore, a carbon electrode obtained by baking such a molded product has unevennesses in density, as mentioned above, so that it does not expand uniformly when heated. For example, when an arc discharge is formed between such a carbon electrode and molten steel in a steel-making arc furnace, the carbon electrode chips or breaks due to its uneven thermal expansion, so that a stable arc discharge cannot be maintained over a long period of time. Whenever such a carbon electrode is damaged, it must be re-adjusted or replaced.

Furthermore, the quality of the molded and baked carbon electrode also varies with variations in the quality of the raw coke and binder, so that it is difficult to manufacture carbon electrodes of constant quality.

Carbon electrodes usually have the properties shown in Table 1.

TABLE 1

|  | High-load electrode | Nipple |
| --- | --- | --- |
| Bulk density (g/cc) | 1.65–1.70 | 1.75–1.80 |
| Specific electrical resistance ($\mu\Omega$m) | 5.0–6.5 | 4.0–5.0 |
| Bending strength (Kgf/cm$^2$) | 100–130 | 220–300 |
| Young's modulus (Kgf/mm$^2$) | 800–1000 | 1200–1500 |
| Coefficient of thermal expansion ($\times 10^{-6}$/°C.) | 1.0–1.2 | 0.9–1.1 |

A high-load electrode is an electrode used to improve the productivity of a steel-making arc furnace by applying thereto during a short period of time ultra-high power in much higher than the electrical power applied to an electrode in an electric furnace. Nipples are joints connecting a plurality of carbon electrodes together so that the electrodes can be used in a line in an arc furnace. The nipples have a diameter smaller than that of the carbon electrodes, and receive a high mechanical load when used as joints. The nipples through which a large current is to flow are provided with taper screws at both end portions thereof, and are made of the same carbon material as the carbon electrodes.

A carbon electrode should preferably have a high bulk density, a low specific electrical resistance, a high bending strength, a comparatively low Young's modulus, and a low coefficient of thermal expansion.

These five properties of a carbon electrode are mutually related; specific electrical resistance decreases in inverse proportion to bulk density and the bending strength, Young's modulus and coefficient of thermal expansion increase in proportion thereto.

However, a carbon electrode having a high Young's modulus and a high coefficient of thermal expansion is more likely to break or chip while in use; such a carbon electrode is undesirable.

Therefore it is necessary to increase the bulk density of the carbon electrode without producing an increase in the Young's modulus and coefficient of thermal expansion thereof.

Two kinds of raw coke are used in the production of carbon electrodes. They are pitch coke obtained from coal, and coke obtained from petroleum. The properties of these two kinds of coke are compared in Table 2.

TABLE 2

|  | Bulk density | Coefficient of thermal expansion |
| --- | --- | --- |
| Pitch coke | 1.64–1.66 | 0.7–0.75 |
| Petroleum coke | 1.67–1.70 | 0.9–1.0 |

When petroleum coke is used as the raw material for manufacturing carbon electrodes, both the bulk density and the coefficient of thermal expansion of the final products increase.

When pitch coke is used for manufacturing carbon electrodes, both the bulk density and coefficient of thermal expansion of the final products decrease.

Therefore, if a method enabling the production of a carbon electrode with an increased bulk density from pitch coke is discovered, desirable effects can be obtained.

SUMMARY OF THE INVENTION

The present invention has been developed with a view to eliminating the drawbacks encountered in conventional methods of manufacturing carbon electrodes.

A first object of the present invention is to provide a carbon electrode with substantially none of the cavities which occur in a conventional carbon electrode due to bubbles and water contained in the kneaded carbon mixture.

A second object of the present invention is to provide a carbon electrode which is substantially unbroken and unbent during the formation of the arc discharge.

A third object of the present invention is to provide a carbon electrode of a quality which is substantially uniform and not influenced by variations in the qualities of the raw coke and binder.

A fourth object of the present invention is to provide a method of manufacturing carbon electrodes which enables an increase in the bulk density of the final product, while minimizing the consequent increase in its coefficient of thermal expansion.

A fifth object of the present invention is to provide a method of manufacturing carbon electrodes which can be applied easily to existing equipment for manufacturing carbon electrodes, by modifying the equipment to only a small extent.

These objects of the present invention can be achieved by extrusion-molding under reduced pressure a kneaded mixture of raw coke and a binder.

DESCRIPTION OF THE PREFERRED EMBODIMENT

Figure 1:
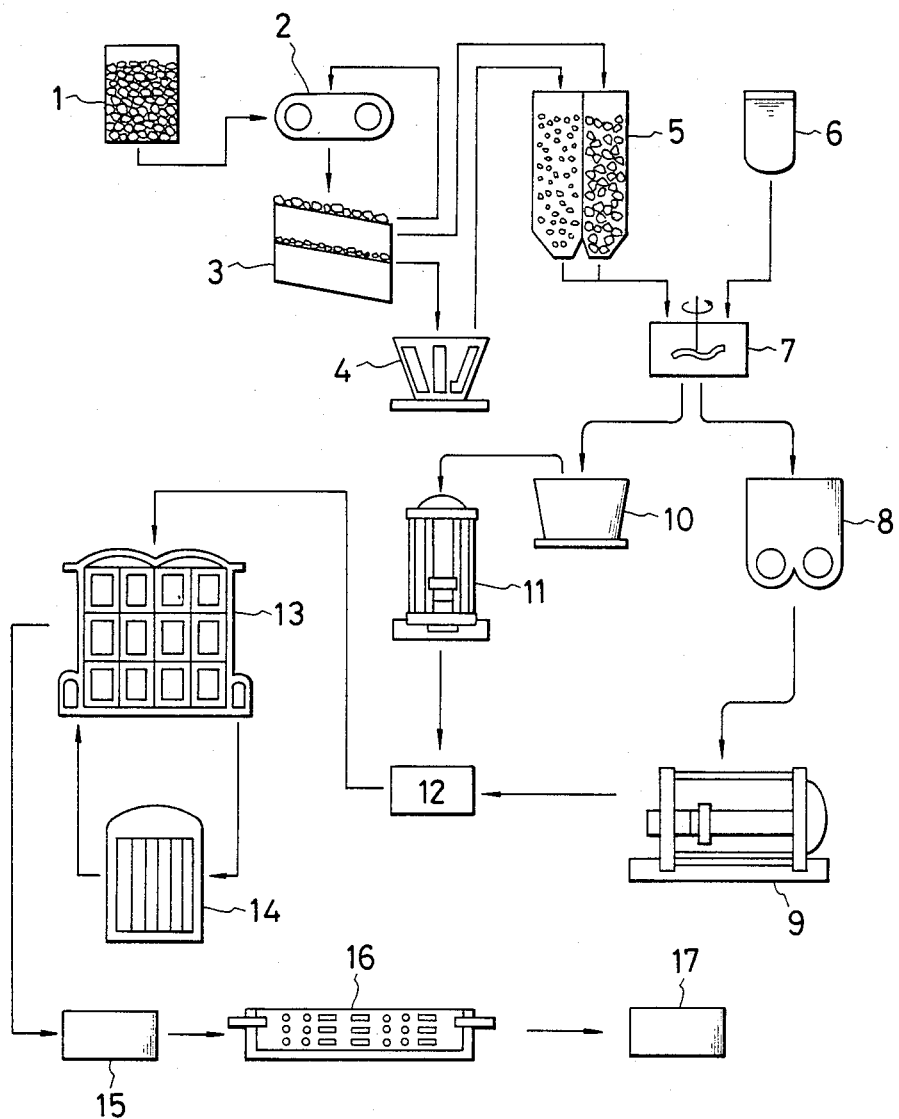
FIG. 1 shows the process of a conventional method of manufacturing a carbon material.

The steps of manufacturing a carbon electrode according to the present invention are basically identical with those when manufacturing it with a conventional carbon material.

The raw material 1 can be petroleum coke, regular coke, natural graphite, anthracite, or carbon black. Of these materials, regular coke is preferable. In order to reduce variations in the quality of the carbon electrodes as far as possible, the specific gravity, heat conductivity, coefficient of expansion, ash content, and sulfur content of the material are measured before they are used. The material used is adjusted on the basis of these measurements.

Each of the coarse grinder 2 and pulverizer 4 consists of one or a combination of a plurality of grinders or pulverizers, which are selected from the various types of such machines in accordance with the size of the material to be ground or pulverized and the desired grain size of the eventual ground or pulverized material. These machines include, for example, a jaw crusher, a roll crusher, a hammer crusher, and a roller mill. The ground material usually has particle diameters of 0.2 mm–20 mm, which is separated into several groups of particles each consisting of particles having grain sizes within a predetermined range.

The separated particles of raw material are mixed in such a manner that the resultant mixture has a predetermined distribution of grain size. These particles are generally mixed so that the molded body 12, which will be described later, has an optimal bulk density and coefficient of thermal expansion.

Coal tar pitch, coal tar, or a synthetic resin is employed as the binder 6. The binder is kneaded with the mixture of raw materials in the kneader 7 while these materials are heated. The amount of binder added varies with the type and grain size of the raw material. In short, this amount should be within a range that enables the kneaded product to have a suitable plasticity for the molding thereof. In general, the higher the percentage of fine particles in the mixed raw materials, more binder is required.

According to the present invention, 25–50 parts of binder for 100 parts of mixed raw materials are usually added. If less than 25 parts of binder is added, it is difficult to carry out the molding, which will be described later. In such a case, strain and cracks occur readily in the molded product. If more than 50 parts of binder is added, the material being molded deforms, or nonhomogeneous molded product with a number or pores is obtained.

The kneading temperature is usually 140°–170° C., and is selectively set to a level within a range that enables the fluidity of the binder to be kept high enough to wet the mixed raw materials.

A Werner kneader or a ribbon vane kneader is usually used as the kneader 7. When the mixed raw materials contains fine particles, a pressure kneader or heating rolls can be used in addition in order to knead the material completely. The kneaded product obtained is extrusion-molded.

According to the present invention, the extrusion-molding of the kneaded mixture is done under reduced pressure.

The total amount of kneaded mixture required for the manufacture of the carbon electrodes can be extrusion-molded in one step, but the kneaded mixture required for manufacturing the carbon electrodes is usually divided into several parts, one part is supplied to the extruder to be compressed, another part being then supplied on top of the compressed part to be itself compressed. These operations are repeated to compress the total amount of kneaded mixture required for the production of the carbon electrodes.

Figure 2:
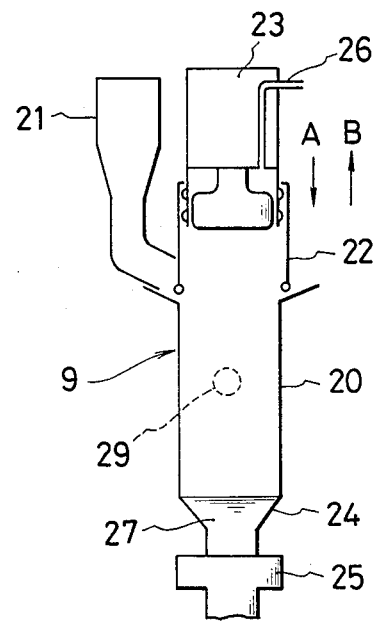
FIGS. 2 and 3 are respectively a schematic diagram of an extruder used when the method according to the present invention is practiced.

Before the kneaded mixture is extrusion-molded, it is usually cooled to 100°–130° C. and thereafter fed to an extruder 9 as shown in FIG. 2 by way of an example of apparatus for practicing the present invention.

In order to cool the kneaded mixture, a device such as a rotary drum cooler is used.

The extruder 9 has a cylindrical container 20 with a nozzle 24 formed at the lower end of the container. A closing ram 25 is provided at the end of the nozzle 24, and a sleeve 22 at an upper portion of the container 20.

A pre-pressurizing ram 23 is provided in the sleeve 22 in such a manner that the ram 23 can be moved vertically. A vacuum pipe 26 is mounted in the pre-pressurizing ram 23.

In order to mold a carbon electrode using this extruder 9, the pre-pressurizing ram 23 is moved upward (in the direction of the arrow B) to feed part of a kneaded mixture from a hopper 21 into the container 20.

The sleeve 22 is then lowered to reduce the pressure in the interior of the molding machine 9, and the pre-pressurizing ram 23 is lowered in the direction of the arrow A to compress the kneaded mixture supplied to the container 20. According to the present invention, this compression is carried out as air is sucked out through the vacuum pipe 26, which opens onto the inner surface of the preheating ram 23, to keep the pressure in the interior of the molding machine 9 low.

The lower end portion of the nozzle 24 is blocked by remaining material 27 from the preceding extrusion-molding operation, and the opening of the nozzle 24 by the closing ram 25, so that the interior of the container 20 can be maintained at a predetermined degree of vacuum.

The degree of vacuum employed in the, compression in the present invention is usually below 300 Torr, and preferably below 50 Torr.

When the degree of vacuum in the container 20 is higher than 300 Torr, it is difficult to remove bubbles and water from the kneaded mixture. This makes it difficult to obtain carbon electrodes of uniform quality after being baked.

According to the present invention, the compression force employed is usually around 1500–3000 tons, and the compression temperature generally 100°–110° C. The compression time is generally 20–30 minutes, though it varies with the quantity of the kneaded mixture supplied to the container, and the compression force and temperature.

After part of the kneaded mixture has been compressed, another batch thereof is supplied on top of the pressed piece and is compressed in the same manner under vacuum. The same operation is repeated to compress the total amount of the kneaded mixture.

Figure 3:
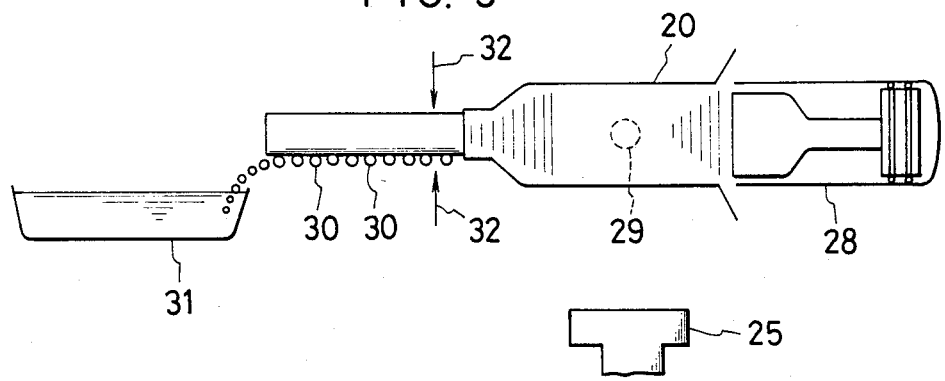

Then, the sleeve 22 may be raised in the direction of arrow B, and thereafter the container 20 may be turned about a shaft 29 to bring it into a horizontal position as shown in FIG. 3. A main ram 28 may then be coupled to the horizontally positioned container 20 to operate pushing of the kneaded mixture out of the container on rolls 30 and cutting thereof into pieces of the prescribed length or lengths by cutter means 32, followed by cooling of the cut pieces of the kneaded mixture in a water tank 31. Then, the cooled products may be fed to a baking step.

The extruded product is cut to predetermined lengths and sent on to a baking step.

In the present invention, the baking conditions are not particularily limited. In order to prevent the molded product from being deformed and oxidizied while it is being heat-treated, the molded product is embedded in a packing material such as coke powder and silica sand, and is heated to, for example, 700°–1300° C. to carbonize the binder.

Since such molded product is liable to crack or become nonhomogeneous during the binder-carbonizing steps, the heating rate is suitably controlled.

The number of days required for the baking step differs with the type of baking furnace used and the dimensions of the molded product; it normally requires 10–20 days for heating the molded product and another 5–10 days for cooling it.

A lead hammer type of continuous furnace or a tunnel furnace is used as the baking furnace, and the fuel used is mainly fuel oil or natural gas. An approximately 10% decrease in weight and a 1–3% linear shrinkage occur in the molded product while it is being baked.

During the baking step, about 30–40% of the binder is volatilized to form pores in the molded product. These pores are filled by a standard method with an impregnant such as molten pitch to stop them up, and the resultant molded product is subjected to secondary baking.

The impregnation of the pores and the secondary baking of the resultant molded product can be repeated several times if necessary. The baked product thus obtained is further heat-treated if necessary in a graphitization furnace 16 at about 3000° C. As a result, the baked product is graphitized, i.e. the carbon turns into graphite.

The graphitization of the baked product is done in a regular way by embedding the baked product in coke particles, i.e. a packing material packed into the furnace, and applying an electric current directly to the baked product.

In general, it takes 2–4 days to heat a baked product electrically to graphitize it, and 1–2 weeks to cool the graphitized product.

The resultant baked or graphitized product is cut or threaded to obtain the final electrode.

As described above, the present invention is characterized in that a kneaded mixture is compressed under reduced pressure.

Thus, according to the present invention, the kneaded mixture can be compressed while the bubbles and water mixed thereinto during the kneading step are removed therefrom.

Therefore a molded product containing substantially no bubbles or water can be obtained. When such a molded product is baked by a known method, carbon electrodes having a uniform bulk density and coefficient of thermal expansion can be obtained.

Accordingly, when such a carbon electrode is used to form an arc discharge, there is substantially no abnormal breakage which would occur if the carbon electrode did not have a uniform quality. This carbon electrode is capable of maintaining a stable operation until it has been consumed normally, and enables the yield to be improved.

In prior art methods of this kind, variations in the quality of the carbon electrode due to variations in the raw materials therefor cannot be avoided. In the method according to the present invention, variations due to variations in the quality of the raw materials, such as the number of bubbles and the quantity of water which are mixed into the kneaded mixture, can be suppressed to a minimal level. Accordingly, variations in the quality of the carbon electrode due to variations in the quality of the raw materials, can be suppressed to a minimal level. This enables the production of carbon electrodes of a substantially constant quality.

When pitch coke (regular coke) is used as a raw material, the coefficient of thermal expansion of the carbon electrodes can be minimized and the bulk density thereof increased.

An example of the present invention will now be described.

EXAMPLE 100 parts by weight of pulverized pitch coke and 40 parts by weight of coal tar pitch were kneaded while being heated to 150° C. The kneaded mixture obtained was cooled to 110° C. About 6.5 m$^3$ of the resultant mixture was supplied to a container of a capacity of 6.5 m$^3$, shown in FIG. 2, and was compressed (in a pre-molding press) at 150 Torr and 1500 tons to about 4 m$^3$. About 2.5 m$^3$ of the same kneaded mixture was then supplied on top of this compressed kneaded mixture, and the total combination of these kneaded mixtures were compressed in the same manner at 1500 tons under reduced pressure to 5.5 m$^3$.

About 1.0 m$^3$ of the same kneaded mixture was then supplied onto the top of this compressed product, and the total combination of these kneaded mixtures were compressed in the same manner at 1500 tons under reduced pressure to about 6.0 m$^3$.

The container was then turned to a horizontal position, and the contents thereof were compressed in the same manner at 3000 tons under reduced pressure for final molding. A rod-shaped electrode was extruded through a nozzle provided at the lower end of the container and cut to suitable lengths.

In this operation, seven electrodes of a diameter of 500 mm and seven electrodes of a diameter of 600 mm were produced. The molded electrodes thus obtained were baked under regular baking conditions, filled with an impregnator, and then subjected to secondary baking to obtain carbon electrodes.

The carbon electrodes thus obtained were found to be free from unevennesses in bulk density and coefficient of thermal expansion and had a uniform quality. The bulk density of these carbon electrodes was increased by 0.02 while any increase in the coefficient of thermal expansion thereof was minimized, compared with carbon electrodes obtained by compressing the same kneaded mixture under the same conditions at normal pressure.

What is claimed is:

1. A method of manufacturing carbon electrodes, which comprises the steps of: kneading 100 parts of regular coke with 25 to 50 parts of a binder selected from the group consisting of coal tar pitch, coal tar and a synthetic resin at a temperature of 140° to 170° C., dividing the resultant kneaded mixture into a plurality of portions, compressing sequentially portion by portion the divided portions of the kneaded mixture at a pressure of 1500 to 3000 tons while being subjected to a vacuum below 300 Torr in a manner such that when a first divided portion is compressed, a second portion is supplied on top of the first compressed portion and compressed at the same pressure under the same vacuum, extrusion-molding the compressed mixture as a whole, after the whole of the divided portions of the mixture is thus compressed, baking the resultant extrudate, filling the baked product with an impregnator, and subjecting the resultant product to a secondary baking.

* * * * *